United States Patent [19]

Biber

[11] 3,889,280

[45] June 10, 1975

[54] BELT DRIVEN AUTOMATIC REFLEX CAMERA

[75] Inventor: Conrad H. Biber, Needham, Mass.

[73] Assignee: Polaroid Corporation, Cambridge, Mass.

[22] Filed: Dec. 20, 1973

[21] Appl. No.: 426,948

[52] U.S. Cl. .................... 354/86; 354/83; 354/153
[51] Int. Cl. .................... G03b 17/50; G03b 19/12
[58] Field of Search .......... 354/83, 84, 85, 86, 152, 354/153, 154

[56] References Cited
UNITED STATES PATENTS

| | | | |
|---|---|---|---|
| 3,405,619 | 10/1968 | Land | 354/84 |
| 3,426,664 | 2/1969 | Norton | 354/86 |
| 3,709,122 | 1/1973 | Blinow et al. | 354/83 X |
| 3,714,879 | 2/1973 | Land et al. | 354/83 |
| 3,739,701 | 6/1973 | Erlichman | 354/86 |

*Primary Examiner*—Fred L. Braun
*Attorney, Agent, or Firm*—John W. Ericson

[57] ABSTRACT

A battery operated automatic reflex camera comprising a film transport motor which performs the several functions of moving the reflex mirror to the viewing position, advancing an exposed film unit into a position where it can be grasped by a pair of processing rolls, and driving the processing rolls to eject the film unit while distributing the processing fluid throughout the film unit. The camera is arranged to be powered by a battery, and the apparatus includes a timing belt driven by the motor. The timing belt drives the processing rolls, and controls a cam that sequentially operates the mirror and then operates an advance mechanism before the film unit is engaged by the processing rolls so that the load on the battery is minimized.

8 Claims, 6 Drawing Figures

BELT DRIVEN AUTOMATIC REFLEX CAMERA

This invention relates to photography, and particularly to a novel automatic reflex camera.

Extensive efforts have been made in recent years to make photograhic apparatus simpler and more convenient to operate, while retaining the capabilities, characteristic of fully adjustable technical cameras, of making properly exposed photographs under a variety of conditions. A particular example of the fruits of these efforts is the Polaroid SX-70 Land Camera, manufactured and sold by the Polaroid Corporation of Cambridge, Mass., U.S.A.

The Polaroid SX-70 Land camera is a compact, automated modified reflex camera which responds to the touch of a button to make and process a properly exposed color print. Aside from a trim control which is occasionally needed to adjust for extreme conditions, the only operator controls provided are the shutter button and a focusing knob.

Within the camera, apparatus is provided for carrying out a complex program of operation each time the shutter button is depressed. This program commences by closing the shutter, and then moving the reflex mirror from a viewing position to a taking position. The shutter is then released, and moves toward a fully opened position while a photocell responds to ambient light to control a timing circuit that will close the shutter as soon as enough light has fallen on the film. When that occurs, the shutter is closed and the mirror is returned to its viewing position, in which it covers the exposed film.

The film transport motor then operates a drive mechanism which moves the exposed film unit from its position in a cassette contained in the camera and advances it through a pair of processing rolls that spread processing fluid contained with the film unit to cause the image to be developed. After the mirror is closed, the shutter is opened and the camera is restored to its viewing position.

In order to carry out the various functions necessary to the execution of this program, within the confines of a thin and compact camera, a great many onerous requirements had to be met. While these requirements were met, in the form of the reliable and efficient camera that is currently being marketed, it is the object of this invention to further improve cameras of this kind by simplifying their construction while maintaining the same functional capability.

The Polaroid SX-70 Land Camera is characterized by a large number of interrelated optical, mechanical and electrical features, but it is only with certain of those that this invention is concerned. In particular, mechanical energy for driving the processing rolls, for initially ejecting the film, and for moving the reflex viewing mirror from its taking position to its viewing position, are supplied by a DC motor which is located in the rear of the camera. A processing station comprising the processing rolls through which the exposed film units are driven is located at the front of the camera.

Along the side of the camera is a thin dual gear train having a high speed branch and a low speed branch. The high speed branch drives the processing rolls, and the low speed branch controls timing and positioning functions, including the return of the mirror to its viewing position. Such a system is shown and described in U.S. Pat. No. 3,714,879, granted on Feb. 6, 1973 to Edwin H. Land, Igor Blinow and Vaito K. Eloranta for REFLEX CAMERA, and assigned to the assignee of this application. As there more fully shown and described, movement of the reflex mirror which converts the camera from its viewing mode to its taking mode and vice versa is controlled by a cam driven by one branch of the dual gear train. Just after the shutter button is depressed and the shutter is closed, the motor operates briefly to move the cam to a position in which the mirror will be released to fly up into the taking position. After an exposure has been made, the motor is operated again to cock the mirror back to its viewing position and then eject the exposed film unit and drive it through the processing rolls. The cycle ends when the camera turns to a position near the position at which it will release the mirror.

As a practical matter, it has been found highly desirable to incorporate a precision control circuit, including a braking circuit for the motor, to insure that the motor stops the cam at the desired position within a rather small shaft angle. Apparatus for this purpose is shown and described in U.S. application for Letters Patent Ser. No. 299,667, filed on Oct. 24, 1972 by Joseph J. Abbadessa for PHOTOGRAPHIC APPARATUS WITH PRECISION MOTOR CONTROL, now U.S. Pat. No. 3,811,081, issued on May 14, 1974 and assigned to the assignee of this application.

One of the particular objects of this invention is to eliminate the need for the braking circuit. Another particular object is to eliminate the need for the brief motor operation just before an exposure is made in a camera of the type described. A further particular object is to simplify the construction of the process control and timing drive train. A further particular object of the invention is to simplify the control system, while retaining the same functional program as that achieved in the apparatus described in U.S. Pat. No. 3,714,879.

Briefly, the above and other objects of the invention are obtained by a novel reflex camera construction in which a single drive and timing train is employed. The single drive train comprises an elongated timing belt extending, from an input gear at the rear on one side of the camera, along that side of the camera to a second gear towards the front of the camera. The second gear drives the processing rolls of the camera through intermediate gears.

On the elongated timing belt is formed a cam. The input gear to which the timing belt is connected is driven through a reduction gear by a motor located at the rear of the camera. The apparatus is arranged to produce one complete revolution of the timing belt for each cycle of operation of the camera.

The power train is not operated until after an exposure has been made. Then, with the camera shutter in the closed position, the belt is driven to drive the processing rolls. The first operation performed during the revolution of the timing belt is to drive the mirror back to its viewing position. After that has been accomplished, the cam drives a picker mechanism to advance the film unit just exposed into position in the bite of the processing rolls. The processing rolls then carry the film unit out through an exit slot in the camera while exerting pressure on the film unit to distribute processing fluid within it.

Finally, the cam on the timing belt encounters a switch which is momentarily closed to turn off the motor. This switch is located in advance of the final position of the cam, so that as the motor coasts to a stop, the cam continues to move a short distance. This distance is not especially critical, because the cam is not required to stop in a precisely located position. That result is achieved, in accordance with the invention, by separating the mirror cocking function from the mirror latching function.

The mirror latching function is performed by a small pulse operated solenoid which is briefly energized at the appropriate time to pull a latch out of mirror-locking position, so that the mirror flys up into the taking position. The latch is then spring-returned automatically to a position from which it can be re-engaged by the mirror when it is returned by the cam.

Since the latching solenoid is only required to be energized for a short time, it only need move the latch element a very short distance, and so can be made physically light and relatively small in size. Moreover, it has been found highly desirable to incorporate some form of latch mechanism to positively hold the mirror in its viewing configuration. One form of apparatus that has been used for this purpose is shown and described in U.S. application for Letters Patent Ser. No. 222,964, filed on Feb. 2, 1972 by Igor Blinow for REFLEX CAMERA WITH MIRROR LATCH, now U.S. Pat. No. 3,771,427, issued on Nov. 13, 1973 and assigned to the assignee of this application. The latch incorporated for the purposes of this invention can also serve the purpose of the latch disclosed in that application, and thus a surprising simplification in the overall complexity of the apparatus is obtained.

The apparatus of the invention, and its mode of operation, will best be understood in the light of the following detailed description, together with the accompanying drawings, of an illustrative embodiment thereof.

Figure 1:
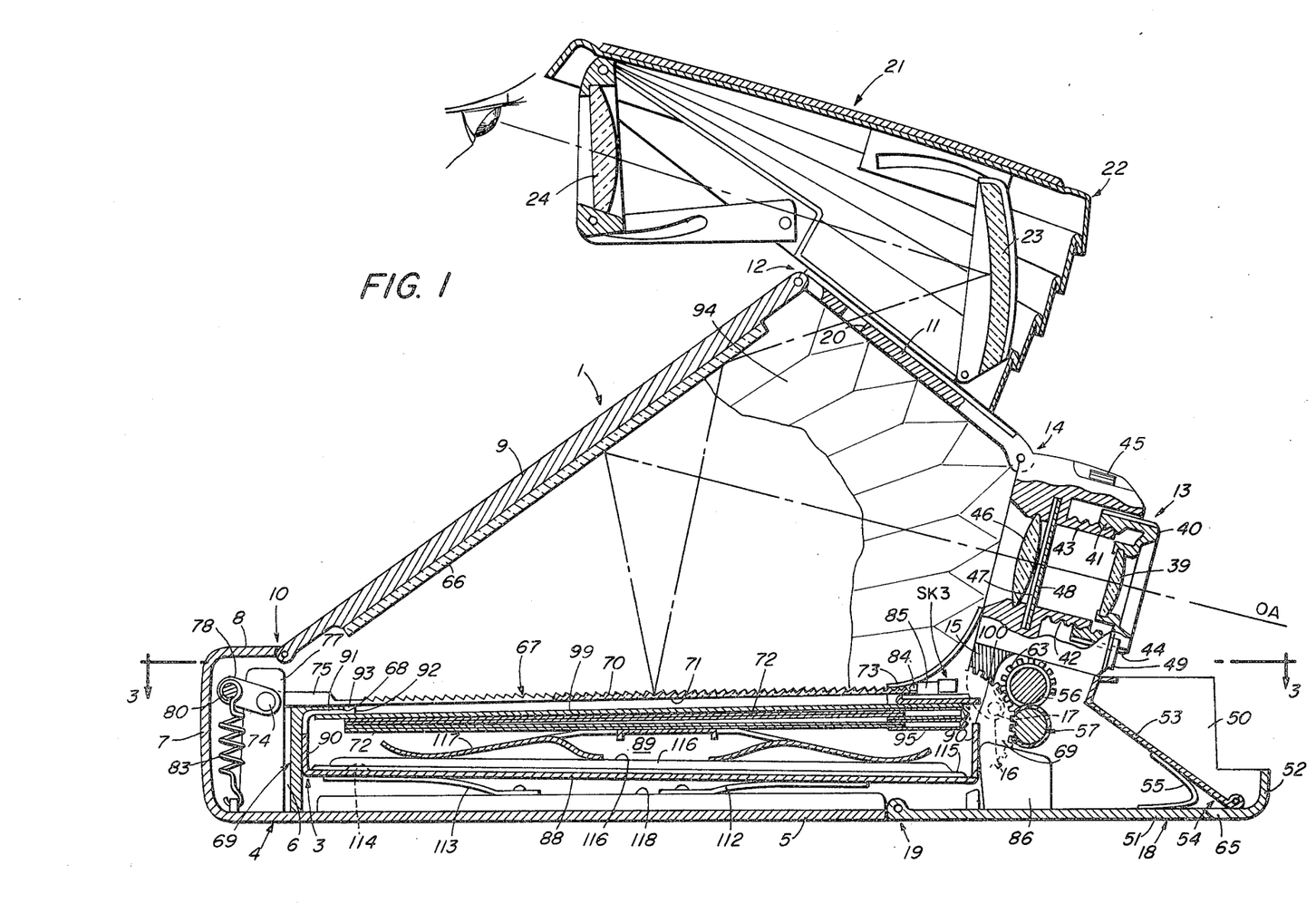
FIG. 1 is a schematic elevational sketch, with parts shown in cross-section and parts broken away, of an automatic camera in accordance with the invention, taken essentially along the lines 1—1 in FIG. 3 but with additional parts shown.

Referring first to FIG. 1, there is shown an automatic camera generally designated 1 arranged to receive film units in a cassette generally designated 3, disposed in the housing of the camera in a manner to be described. The camera is shown in the erect position with a cassette 3 in the condition assumed just after it has been inserted in the camera.

In more detail, the camera 1 comprises a body housing 4 comprising a bottom wall 5, side walls such as 6, and an end wall 7. The top wall 8 of the body housing 4 is hinged to a rear cover panel 9 as suggested at 10. The cover panel 9 is hinged to a forward cover panel 11 as suggested at 12.

The panel 11 is hinged to a lens board and shutter housing generally designated 13, as suggested at 14. The lens board and shutter housing 13 is provided with support arms 15 extending down on either side to ears 16 connected to extensions of the side walls 6 by means shown as pivot pins 17. By this arrangement, the panels 9 and 11 and the lens board and shutter housing 13 can be pivoted between the erected position, shown in FIG. 1, and a collapsed position in which the panels 9 and 11 are substantially parallel to and coplanar with the top panel 8.

In the collapsed position, the lens board and shutter housing 13 comes down into a front housing portion 18. The front housing 18 is hinged to the body housing 4 as indicated at 19, for movement between the position shown in FIG. 1 and the position shown in FIG. 2, in which a cassette 3 can be inserted into the housing.

Figure 2:
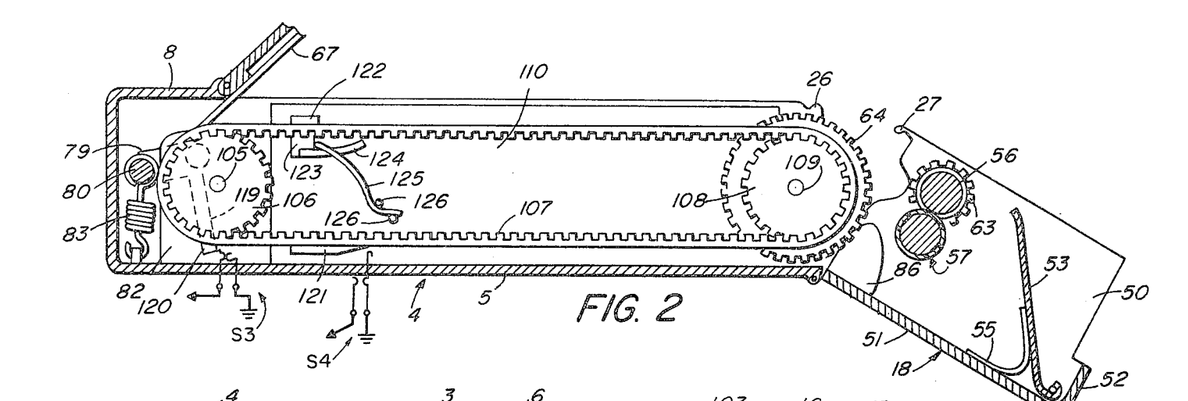
FIG. 2 is a fragmentary schematic elevational view, with parts shown in cross-section, parts omitted and parts broken away, of the apparatus of FIG. 1, taken substantialy along the lines 2—2 of FIG. 3.

The front housing 18 may be held in the position shown in FIG. 1 by conventional detachable latch means, schematically shown in FIG. 2 as cooperating parts 26 and 27 on the housings 4 and 18, respectively. Similarly, the panels 9 and 11 may be held in the erected position shown by a detachable conventional erecting linkage, not shown, extending between the housing 4 and one of the panels.

The forward upper panel 11 is provided with an aperture indicated at 20 which serves to admit light to a viewfinder assembly generally designated 21. The details of the viewfinder assembly 21 form no part of this invention, but, as schematically indicated, comprise a collapsible housing 22 secured to the top panel 11 and containing a concave viewing mirror 23 for directing image-forming rays from the aperture 20 through an objective lens 24 mounted in the housing 22. The housing 22 may be made collapsible, if desired, as shown and described in more detail, for example, in copending U.S. application for Letters Patent, Ser. No. 308,679, filed on Nov. 22, 1972 by Edwin H. Land for ELECTRONIC PHOTOGRAPHIC SYSTEM, assigned to the assignee of this application, and now abandoned.

A taking lens mounted in the lens board and shutter housing 13 comprises an outer movable front element 39 mounted in an adjustable barrel 40. The barrel 40 is threaded, as indicated at 41, to cooperate with corresponding threads 42 formed on a fixed barrel portion 43 of the lens board and shutter housing 13 for rotation about the optical axis of the lens to move the front element back and forth and thereby focus the lens on objects at various distances from the camera.

The adjustable barrel portion 40 is formed with teeth 44 around its outer periphery to cooperate with an intermediate gear, not shown, that connects it to a conventional rotatable manual focusing knob 45 to enable the operator to rotate the front element 39 and thereby translate it along the optical axis of the camera and focus the lens.

A rear lens element schematically indicated at 46 is secured in the barrel portion 43. Between the elements 39 and 46 is located a shutter comprising a pair of relatively movable blades schematically indicated at 47 and 48, to be described below in more detail with reference to FIGS. 4 and 5.

A manually operable shutter button 49 is schematically shown as located on the front of the lens board and shutter housing 13, for convenient access by the finger of an operator. The two elements on the camera which require manipulation by the operator are thus the focus knob 45 and the shutter button 49. Other functions required for the exposure and processing of a photograph are carried out automatically, in a manner to appear.

The front housing 18 comprises side walls such as 50, a bottom wall 51 hinged to the main housing floor at 19, and a partial front wall 52. A plate 53, of sheet metal or the like, is hinged to the bottom wall 51 as indicated at 54 and biased upwardly to the position shown in FIG. 1 by springs 55. See also FIG. 3.

Figure 3:
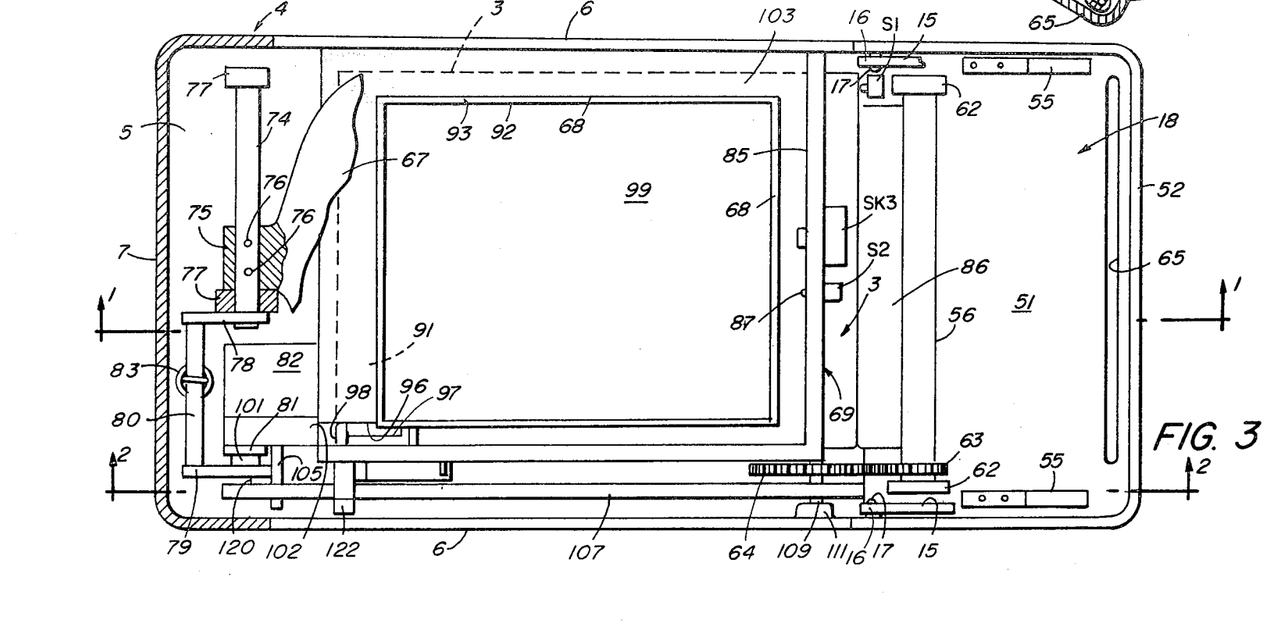
FIG. 3 is a fragmentary schematic plan view of the apparatus of FIGS. 1 and 2, taken substantially along the lines 3—3 in FIG. 1, with parts omitted, parts shown in cross-section and parts broken away.

In the position shown in FIG. 1, the plate 53, lens board and shutter housing 13, and side walls 50 and bottom wall 51 of the housing 18 define a light-shielding space about a pair of spreader rolls 56 and 57. The spreader rolls 56 and 57 are journalled in bearings 62 fixed to the bottom plate 51, as suggested in FIG. 3. The rolls 56 and 57 are in frictional engagement so that when one of the rolls is driven, the other follows. For that purpose, a gear 63 fixed to the spreader roll 56, as shown in FIGS. 1 and 3, is arranged to be driven by a gear 64, in a manner to be described below, and thereby drives the roll 57.

The roll 56 may be made of stainless steel and the roll 57 may be made of stainless steel covered with polyurethane. A film unit, introduced into the bite of the rolls in a manner to appear, will be driven by the rolls toward an exit slot 65 formed in the bottom wall 51.

The optical system of the camera 1 is completed by fixed mirror 66, mounted on the lower surface of the upper panel 9, and a movable mirror 67. The mirror 67 is movable between the position shown in FIG. 1, and a rotated position in which it is closely adjacent to and parallel to the mirror 66. In the position shown in FIG. 1, the mirror 67 covers a framing aperture 68 formed as a rectangular opening in a cassette receiving compartment generally designated 69 formed integrally with the bottom wall 5 of the rear housing 4 and serving to receive the cassette 3 and other apparatus to be described.

In the position of the mirror 67 shown in FIG. 1, a fresnel mirror surface 70 formed on the upper surface of the mirror 67 forms a part of a viewing and focusing system. In that position, light entering along the optical axis OA of the lens is reflected downwardly from the mirror 66, then reflected upwardly from the fresnel mirror surface 70, is again reflected from the mirror 66 to the concave mirror 23, and thence passes through the objective lens 24 to the observer. The observer then rotates the front barrel 40 of the lens to bring the observed image into focus.

When the mirror 67 is moved into its position parallel to the mirror 66, light entering through the lens is reflected from a mirror surface 71 formed on the lower surface of the mirror 67 down onto the uppermost one of a set of film units such as 72 in the cassette 3. In that position, a flexible flap 73 hinged to the end of the mirror 67 covers the aperture 20 in the front of the panel 11 and prevents light from entering through the viewing system and exposing the film unit.

The mirror 67 is mounted on a shaft 74, as best shown in FIG. 3, by means schematically indicated as comprising an extension 75 formed on the end of the mirror 67 and bored to accept the shaft 74, the shaft 74 being affixed to the mirror 67 by pins indicated at 76. The shaft 74 is journalled for rotation in the rear housing 4 in bearings schematically indicated at 77 secured to the bottom plate 5.

The shaft 74 is fixed to a crank arm 78. The crank arm 78 is connected to another crank arm 79 by an intermediate crank pin 80. The crank arm 79 is fixed to a stub shaft 101 that is journalled for rotation in bearings schematically indicated at 81 fastened to the outer housing of a reduction gearing assembly schematically indicated at 102 and driven by a DC motor 82 at times to be described below.

The crank pin 80 is connected to one end of a tension spring 83 that is secured at its other end to the bottom panel 5, as schematically indicated in FIGS. 1 and 2. The spring 83 urges the mirror 67 upwardly, against a stop, not shown, such that it is close to and parallel with the mirror 66.

When the crank assembly 78, 79 and 80 is driven in a manner to be described, the mirror 67 is brought down to the position shown in FIG. 1, where it is detachably retained by a latch schematically indicated at 84. The latch 84 protrudes through a wall 85 formed integrally with the main housing 4, and is spring biased into the latching position shown. The latch 84 is arranged to be released when a solenoid SK3 is energized in a manner to be described.

A support member 86 fixed to the bottom wall 51 of the front housing 18 is adapted to engage and retain a cassette 3 in position on the housing 4 when the front housing 18 is in the position shown in FIG. 1. When the cassette 3 is present in the housing 4, and the housing 18 is closed, a switch S1, schematically indicated in FIG. 3, is closed. At other times, the switch S1 is open, and indicates that the housing is open.

When the mirror 67 is moved into the position shown in FIG. 1, a second switch S2 is closed. As indicated in FIG. 3, the switch S2 has an actuating element 87 protruding through the wall 85 and adapted to be engaged by the mirror 67 when it is in the position shown in FIG. 1. In the position of the mirror 67 shown in FIG. 2, the switch S2 is open.

The cassette 3 may be an SX-70 Land film pack, as manufactured and sold for use in the Polaroid SX-70 Land Camera. The cassettes 3 are generally trapezoidal in cross-section, as shown in FIG. 1, and generally rectangular in plan, as suggested in FIG. 3. The cassettes each comprise a housing, of plastic or the like, comprising a bottom wall 88, side walls such as 89, end walls such as 90, and a top wall 91. The top wall 91 is formed with a rectangular recess 92 surrounded by a rim 93 that mates with the framing aperture 68 in the camera and serves to define the limiting aperture through which the uppermost film unit 72 is exposed.

A lighttight seal is formed about the chamber defined by the panels 9 and 11, the lens board and shutter housing 13, and the housing 4, by flexible bellows panels schmatically indicated at 94. The panels 94 are connected to the sides of the elements with which they define the lighttight film exposing space.

The film units 72 in the cassette 3 may be of the type shown and described in U.S. Pat. No. 3,415,644, issued on Dec. 10, 1968 to Edwin H. Land for NOVEL PHO- TOGRAPHIC PRODUCTS AND PROCESSES, and in U.S. application for Letters Patent Ser. No. 194,407, filed on Nov. 1, 1971 by Edwin H. Land for NOVEL PRODUCTS AND PROCESSES, and now abandoned both assigned to the assignee of this application. Generally, as is more fully disclosed in those references, the film units comprise a number of photosensitive layers in which latent color images can be formed, and other layers which cooperate with the photosensitive layers. A processing composition is contained in a pod 95 at the end of each said film unit. When the film unit is compressed between the spreader rolls 56 and 57, the processing composition in the pod 95 is forced between selected layers of the film unit, thereby initiating a diffusion transfer process, which develops and fixes the image.

Referring to FIG. 3, a slot 96 formed in one corner of the top wall 103 of the cassette receiving compartment 69 exposes a slot 97 formed in the top wall 91 of the cassette 3, and is adapted to receive a picker finger 98. The picker finger 98 is actuated at times to be described to move the topmost one of the film units 72, or a dark slide 99 that initially covers the film units as shown in FIGS. 1 and 3, out through a slot 100 in the end wall 90 of the cassette and into the bite of the rolls 56 and 57. As will appear, the function of ejecting the dark slide 99 is performed automatically when the cassette is first inserted in the camera and the housing 18 is closed.

A DC motor 82 is mounted on the base plate 5 in the housing 4, and has an output shaft connected to drive the input shaft of a reduction gear assembly 102. The motor 82 may be assumed to be a conventional DC motor having an output shaft coupled to the input shaft of a conventional planetary reduction gear train 102. As shown in FIG. 2, the gear train 102 has an output shaft 105 fixed to a gear 106 having teeth meshing with corresponding teeth formed on a flexible timing belt 107. The belt 107 may be of a fiber or fabric reinforced material such as rubber, polyurethane, neoprene or other synthetic resin, selected to form a flexible but relatively inextensible belt.

The timing belt 107 is coupled to a gear 108 fixed on a shaft 109 disposed at the front of the housing 4 and confronting the housing 18. The shaft 109 is journalled in suitable bearings fixed to the wall 110 of the cassette well 69 and to a bearing 111 secured to the wall 6, as indicated in FIG. 3.

On the shaft 109 is a fixed gear 64 which drives the processing rolls 56 and 57 through the gear 63, as described above, when the front housing 18 is in the position shown in FIG. 1.

The cassette 3 is retained in the position shown, and urged upwardly into engagement with the framing aperture 68 in the camera, by a pair of springs, such as the spring 112 shown in FIG. 1, toward one end of the cassette 3, and a resilient pair of spring contact fingers such as 113. The contact fingers 113 are electrically connected to circuit means, to be described, to supply power to the camera and strobe unit when the cassette is in position.

The fingers 113 are formed with contacts such as 114 that extend up through cooperating apertures in the bottom wall 88 of the cassette 3, and thence through corresponding apertures formed in an insulating backing plate 115, of cardboard or the like, into engagement with the terminals of a battery, generally designated 116 and described in more detail in the above-cited copending U.S. application Ser. No. 308,679.

The battery 116 is retained in position against the bottom wall 88 of the cassette 3 by means of a spring schematically shown at 117 that also serves to urge the film units 72 upwardly toward the framing aperture in the camera. Most of the components of the camera control circuits, to be described below, may be made in compact integrated circuit form and disposed in a suitable compartment on the floor of the housing 8, as schematically indicated at 118.

As best shown in FIGS. 2 and 3, the crank arm 79 is formed integrally with an angularly disposed crank arm 119 that extends outwardly to an extension 120. The extension 120 passes beneath the belt 107, in position for engagement with a cam 121 formed integrally with the belt, and also into a position, shown in FIG. 2, in which it can close the contacts of a switch S3, for purposes to be described.

When the shaft 105 is turned by the motor 82 in the sense driving the belt 107 clockwise in FIG. 2, the cam 121 engages the extension 120 formed on the crank arm 119, causing the switch S3 to open and driving the crank arms 79 and 78 through the intermediate crank pin 80 to turn the shaft 74 and bring the mirror 67 from the position shown in FIG. 2 down into the latched position shown in FIG. 1. As the cam 121 drives the arm 119 clockwise, as seen in FIG. 2, the extension 120 rises radially away from the cam 121 because of the different centers of rotation of the shaft 105 and of the arm 119 about the shaft 101. The cam 121 may be arranged to leave the extension 120 just after the mirror 67 has been brought down into position to be captured by the latch 84 in FIG. 1.

Freed of the load of the arm 119 working against the spring 83, the cam 121 travels into engagement with a slider arm 122. The arm 122 is formed integrally with a downwardly extending arm 123 which is bent to extend through a slot 124 formed in the wall 110, and is bent again to form the picker finger 98 described above. The assembly comprising the arms 122 and 123 and the integral picker finger 98 are urged into the position shown in FIG. 2 by a light spring 125 affixed to one end of the wall 110 by means shown as pins 126.

As the arm 122 is driven to the right in FIG. 2 by the cam 121, it rides up in the slot 124 until it rides over the cam 121. The arm 122 is then returned to the position shown in FIG. 2 by the spring 125. In the meantime, the picker arm 98 has engaged the uppermost one of the film units, or the dark slide 99, in the cassette 3, and advanced it into engagement with the processing rolls 56 and 57. The rolls are simultaneously driven, through the belt 107 and the gears 108, 64 and 63.

As the belt 107 continues to be driven, the dark slide or film unit will be ejected through the rolls 56 and 57, and thence out through the exit slot 65. Assuming that the ejected element is a film unit 72, the processing fluid within the pod 95 will be distributed through it as it passes through the processing rolls, causing a finished print to be produced shortly after the unit is ejected from the camera.

As the cam 121 approaches the position shown in FIG. 2, it momentarily closes the switch S4. As will appear, closure of the switch S4 will interrupt power to the motor, causing it to coast to a stop with the cam 121 approximately in the position shown in FIG. 2. The exact final position of the cam 121 is not critical.

Figure 4:
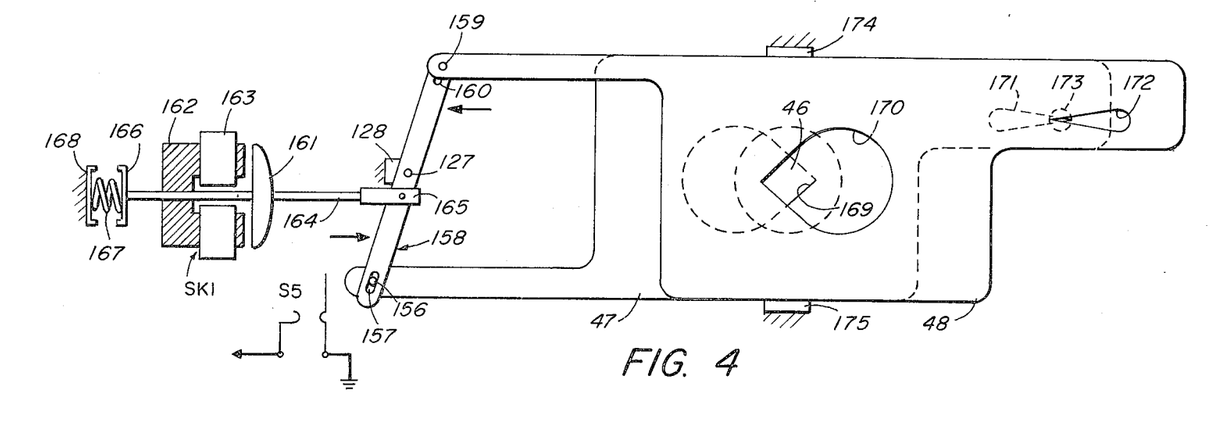
FIG. 4 is a schematic elevational sketch, with parts shown in cross-section, of exposure control means forming a portion of the apparatus of FIGS. 1 through 3, on an enlarged scale.
Figure 5:
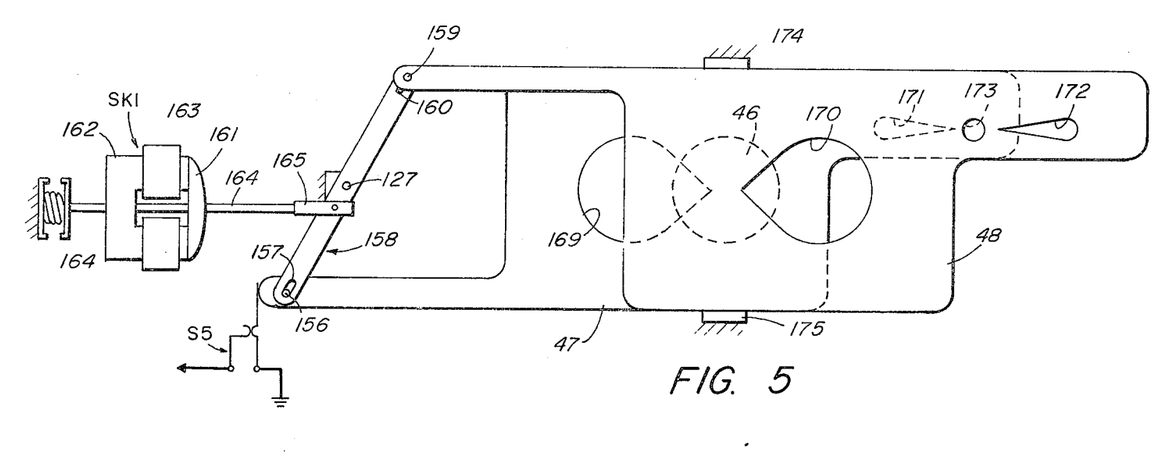
FIG. 5 is a schematic elevational sketch of a the apparatus of FIG. 4, showing the parts in another position assumed during their cycle of operation.

As schematically shown in FIGS. 4 and 5, the shutter comprises a pair of blades 47 and 48. The shutter blade 47 is provided at one end with a pin 156 that is received in an elongated slot 157 formed in one end of a walking beam 158. Similarly, the blade 48 is provided at one end with a pin 159 that is received in a slot 160 formed at the other end of the walking beam 158.

The beam 158 is rotatably mounted on a shaft 127, for free rotation about the axis of the shaft 127 except as constrained by a solenoid SK1, and associated apparatus, next to be described. The shaft 127 may be secured to a suitable fixed support as suggested at 128.

The solenoid SK1 has an armature 161 adapted to be attracted to a core 162 when windings such as 163 on the core 162 are suitably excited in a manner to be described. An actuator shaft 164 connected to the armature 161 is formed with a clevis 165 at one end that is rotatably pinned to the walking beam 158. The shaft 164 extends through the armature 161, to which it is affixed, and thence through a suitable bore formed in the core 162 to a stop plate 166 formed integrally with the arm 164.

The arm 164 is urged through the position shown in FIG. 4, as the walking beam rotates in the sense indicated by the arrows, by means of a spring 167 extending between the plate 166 and a fixed support plate 168 secured in the lens board and shutter housing 13. By this arrangement, the shutter blades 47 and 48 are driven, through the intermediate position shown in FIG. 4, toward an open position, by the spring 167 when the solenoid SK1 is deenergized. The blades 47 and 48 are moved to the position shown in FIG. 5 when the solenoid SK1 is energized.

In the intermediate positon of the shutter blades shown in FIG. 4, a tear-shaped aperture 169 in the blade 47, and a corresponding oppositely directed tear-shaped aperture 170 in the blade 48, partly expose the lens elements such as 46 at an intermediate aperture. In this position of the blades 47 and 48, a second generally tear-shaped aperture 171 in the blade 47, and a corresponding oppositely directed tear-shaped aperture 172 in the blade 48, correspondingly partially expose an aperture 173 in any suitable mask, not shown, behind which a photocell, to be described, is located.

In the position of the parts shown in FIG. 5, with the solenoid SK1 energized, the lens openings are closed because the apertures 169 and 170 in the shutter blades 47 and 48 are out of registry. The photocell aperture 173 is likewise closed at this time. As the shutter blades 47 and 48 are positioned relative to each other by the walking beam 158, under the control of the solenoid SK1 and the spring 157, they are guided for parallel movement by guide means suggested at 174 and 175, fixed in the lens board and shutter housing 13.

Comparing FIGS. 4 and 5, a normally open switch S5 is closed by the end of the blade 47 in the closed position of the shutter shown in FIG. 5. Closure of the switch S5 produces a signal used to control the apparatus in a manner to be described below.

The control circuits for the camera of FIGS. 1 through 5 will next be described with reference first to FIG. 6. For simplicity, the motor 82 is shown schematically in FIG. 6 as being directly connected to the output shaft 105 that drives the gear 106. The gear 106 drives the timing belt 107 carrying the cam 121, as described above.

The motor 82 is operated when a conventional electronic switch S7 is closed and a supply potential at B+ is present to cause the flow of operating current through the load terminals $a$ and $b$ of the switch S7 and through the winding of the motor 82 to ground. The switch S7, and other electronic switches to be described, may be any conventional electronic switches having load terminals $a$ and $b$ between which a low impedance appears when a positive signal current is supplied to a control terminal $c$ with respect to ground.

The switch S7 is closed to cause the motor 82 to run when a flip flop F1, of any conventional design, is set to produce a signal labeled RUN that is positive with respect to ground. The convention followed here, as elsewhere in the drawings to be described, is that the label indicates the logical condition present when the labeled lead is positive with respect to ground. Absence of the labeled condition causes a ground potential to appear on the labeled lead.

The flip flop F1 is arranged to be set when a logic 1 signal appears at the output terminal of a conventional OR gate 190. The gate 190 produces a logic 1 output signal, and applies it to the set input terminal S of the flip flop F1, in response to either a START pulse, produced at times by a conventional one-shot multivibrator 191 in a manner to be described, or to a logic 1 signal appearing at the output terminal of a conventional AND gate 192.

The multivibrator 191 produces a positive pulse at the trailing edge of a CLEAR pulse produced at times by a conventional one-shot multivibrator 193. The CLEAR pulse is produced by the one-shot multivibrator 193 at the rising transition produced when the front housing 18 in FIG. 3 is closed and the cassette 3 is in the receptacle 69 to cause the switch S1 to be closed.

Referring again to FIG. 6, the switch S1 may be provided with two armatures $a$ and $b$. The armature $a$ is connected to ground, and when the switch S1 is closed, a falling transition is produced that triggers the one-shot multivibrator 193. At the same time, or slightly ahead of that time, the armature $b$ of the switch S1 is closed to apply the battery potential CB+, from the battery 116 in the cassette 3 as shown in FIG. 1, to other circuits of the camera, as a supply potential labeled B+.

The CLEAR pulse is applied to one input terminal of a two input terminal OR gate 194. The gate 194 has an active output terminal connected to the reset input terminal R of the flip flop F1. Accordingly, the flip flop F1 is reset when the CLEAR pulse is produced, and, after the CLEAR pulse, is set by the START pulse produced by the multivibrator 191 and supplied through the gate 190.

A second input terminal of the OR gate 194 receives a signal END, produced as a positive pulse by a conventional one-shot multivibrator 195 when the switch S4 is momentarily closed by the cam 121 on the belt 107 as the cam moves toward the end of an operating cycle in a manner to be described. When the END pulse is produced, the flip flop F1 is reset to remove the RUN signal, and thereby stop the motor 82.

A first input terminal of the AND gate 192 receives a pulse labeled SCP, produced as a positive pulse by a conventional one-shot multivibrator 196 at a transition to ground produced by the switch S5 when the shutter is closed, as described above in connection with FIGS. 4 and 5. The second input signal applied to the AND gate 192 is a positive level labeled MUS. The signal MUS is produced at the output terminal of a conventional NOR gate 197 when the switch S3 is closed as the mirror 67 is released and moves to its upper, or film exposing, position. As the switch S3 is closed by the mirror 67, a stop 198, which may be assumed to be secured to the top panel 9 in FIG. 1, is engaged and holds the mirror against the force of the spring 83, shown schematically in FIG. 9.

The falling transition produced by the switch S3 when first closed triggers a conventional one-shot multivibrator 199 to produce an output pulse that has a duration sufficient to persist beyond the time when the mirror 67 may be vibrating or bouncing at the end of its travel to the stop 198. At the trailing edge of the pulse produced by the one-shot multivibrator 199, a conventional one-shot multivibrator 200 is triggered to produce a positive pulse labeled EMD.

As described above, the shutter blades 47 and 48 are normally in the open position, and held there under the influence of the spring 167. The solenoid SK1 is energized to close the shutter when a conventional electronic switch S8 is closed by a positive level labeled CLOSE produced when a flip flop F2 is set in a manner to be described. When the flip flop F2 is set, the signal CLOSE closes the switch S8 to admit current from the supply terminal at B+ through the winding of the solenoid SK1 to ground.

The flip flop F2 is arranged to be set when a logic 1 signal is produced at the active output terminal of a conventional OR gate 202. The gate 202 produces a logic 1 output signal to set the flip flop F2 in response to either a pulse from a conventional one-shot multivibrator 203 or to a pulse produced by another conventional one-shot multivibrator 204.

The one-shot multivibrator 203 is triggered by the transition toward ground produced when a pushbutton SPB is momentarily depressed. The pushbutton SPB has an actuating button comprising the shutter button 49 described above.

The multivibrator 204 produces an output pulse labeled EE in response to the rising transition produced when a conventional Schmitt trigger circuit 205 receives an input voltage above a predetermined value. The Schmitt trigger 205 is controlled by a photocell that is arranged to sense the light passing through the aperture 173 described above in connection with FIGS. 4 and 5.

Figure 6:
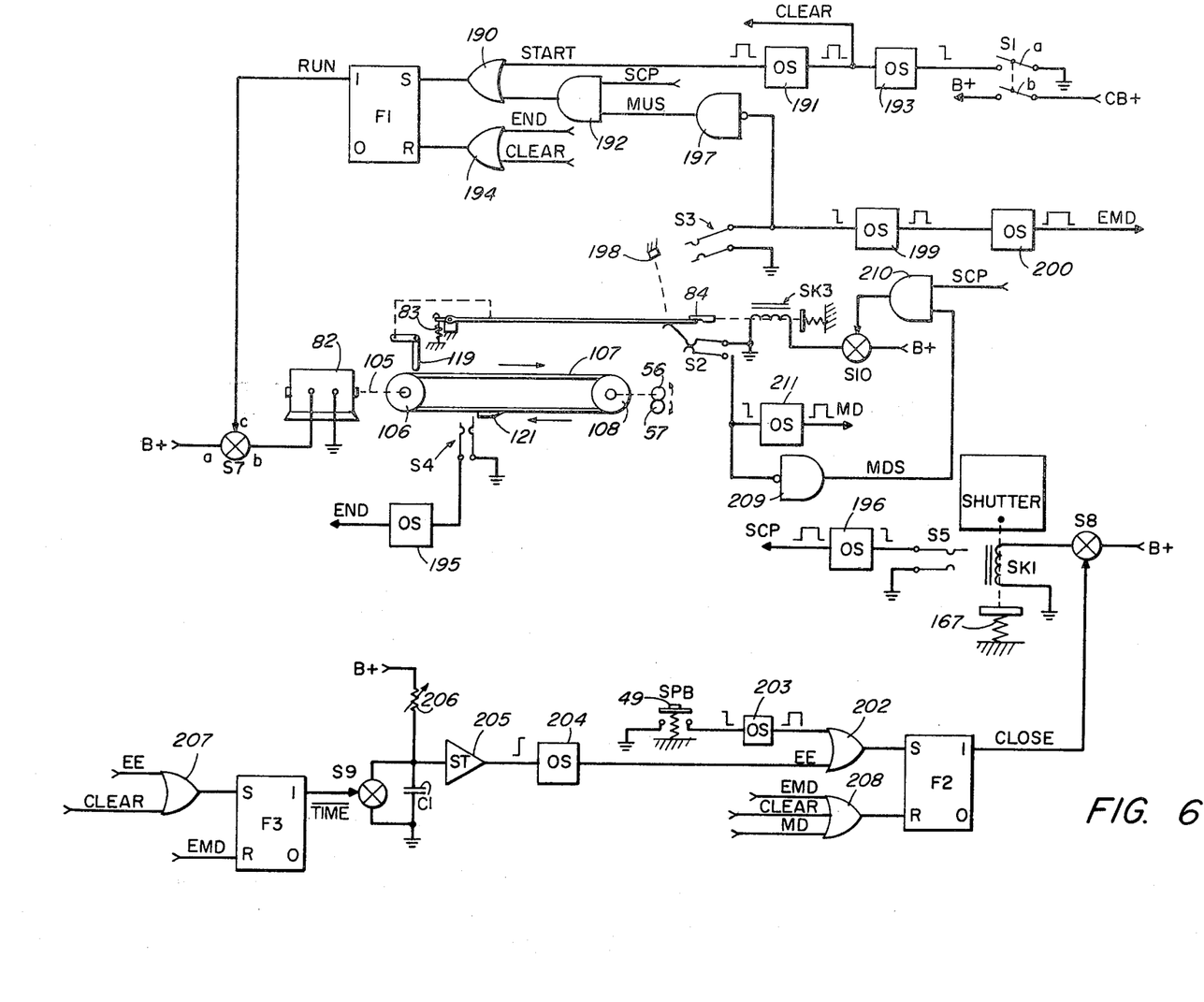
FIG. 6 is a schematic block and wiring diagram of exposure control and film processing apparatus forming a part of the camera of FIG. 1.

Turning to FIG. 6, the photocell comprises a photon-conductive element 206 that has a high impedance when not illuminated, and a low impedance when illuminated. The photoconductor 206 is connected between the supply terminal at B+ and the active input terminal of the Schmitt trigger circuit 205.

The active input terminal of the Schmitt trigger 205 is connected to ground through a storage capacitor C1. A conventional electronic switch S9 has load terminals connected in parallel with the capacitor C1, to shunt the capacitor C1 when the switch S9 is closed.

The switch S9 is closed when a logic 1 signal labeled $\overline{TIME}$ is applied to its control terminal. The signal $\overline{TIME}$ is present at logic 1 when a flip flop F3 is set.

The flip flop F3 is set when an OR gate 207 produces a logic 1 output signal and applies it to the set terminal S of the flip flop F3. The gate 207 has two input terminals, each receiving a different one of the signals labeled EE and CLEAR. Accordingly, the flip flop F3 is set at any time that any of these signals is present at logic 1. The flip flop F3 is reset by the signal EMD corresponding to the output pulse produced by the one-shot multivibrator 200.

The flip flop F2 is arranged to be reset by an OR gate 208 in response to any of the signals EMD, CLEAR or MD. The manner in which the EMD and CLEAR pulses are produced has been described above. The signal MD is produced as a positive pulse by a conventional one-shot multivibrator 211 in response to the ground-going transition produced when the switch S2 is closed as the mirror 67 is moved down into the latched position.

When the mirror 67 is moved down and the switch S2 is closed, a conventional NOR gate 209 produces a logic 1 signal labeled MDS that is applied to one input terminal of a conventional AND gate 210. The second terminal of the gate 210 receives the "shutter closed" pulse CP produced by the multivibrator 196 as discussed above.

When the pulse SCP is produced and the signal MDS is present, the gate 210 produces a logic 1 output signal that closes a conventional electronic switch S10 to briefly energize the solenoid SK3. The solenoid SK3 then retracts the latch 84 and allows the mirror 67 to spring up under the influence of the spring 83 into the picture-taking position described above.

Having thus described the construction of the illustrated embodiment of the invention, its operation will next be described with reference to FIGS. 1 through 6. First, referring to FIGS. 1 and 2, assume that the housing 18 is open, as shown in FIG. 2, and that a cassette 3 is next inserted into the position shown in FIG. 1.

When the housing 18 is closed, the switch S1 in FIGS. 3 and 6 will be closed. Referring to FIG. 6, that will cause the potential B+ to be produced, and trigger the multivibrator 193 to produce the CLEAR pulse.

The CLEAR pulse will reset the flip flops F1 and F2, and set the flip flop F3, through the OR gates 194, 208 and 207, respectively. Assuming that the camera is in the erected position shown in FIG. 1, with the mirror 67 down as shown, the switch S2 will be closed as shown in FIG. 6.

The trailing edge of the CLEAR pulse will trigger the multivibrator 191 to produce the START pulse that sets the flip flop F1 trhruogh the OR gate 190. That will cause the signal RUN to be produced, closing the switch S7 and causing the motor 82 to begin to run to drive the timing belt 107.

Referring to FIGS. 1 and 2, with the mirror 67 down, the follower 120 will be out of the way, and the cam 121 will pass it without engagement. The switch S3 will be open.

The cam 121 next encounter the arm 122 that is connected to the picker finger 98 as shown in FIG. 3. The picker finger will then engage the corner of the dark slide 99 that covers the first film unit 72, and move the dark slide out into engagement with the processing rolls 56 and 57, which are rotating at this time. The dark slide will next be driven against the plate 53 and down and out through the exit slot 65.

The motor will continue to operate until the cam 121 reaches the position in which it momentarily closes the switch S4, shown in FIGS. 2 and 6, to trigger the one-shot multivibrator 195 to produce the pulse labeled END. The END pulse now resets the flip flop F1 through the OR gate 194, causing the level RUN to disappear and open the switch S7 to stop the motor 82.

The parts will coast to a stop with the cam 121 somewhere in the vicinity shown in FIG. 2.

Next, assume that the shutter pushbutton 49 is depressed to close the switch SPB in FIG. 6, triggering the one-shot multivibrator 203. The pulse produced by the multivibrator 203 will set the flip flop F2 through the OR gate 202. The signal CLOSE will be produced, closing the switch S8 and supplying current to the shutter operating solenoid SK1.

Referring to FIGS. 4 and 5, energizing the solenoid SK1 will cause the shutter blades 47 and 48 to be moved from the open position, through the intermediate position shown in FIG. 4, to the position shown in FIG. 5, covering the opening in the lens 46. The photocell aperture 173 will also be closed at this time.

Referring to FIG. 6, with the flip flop F3 set, the level TIME will be produced to close the switch S9, shunting the capacitor C1. When the shutter is closed, the switch S5 will be closed to trigger the one-shot multivibrator 196 to produce the pulse SCP. The pulse SCP, applied to the gate 210, will cause the switch S10 to be closed. The gate 210 is enabled at this time by the presence of the signal MDS produced by the NOR gate 209.

With the switch S10 closed, the solenoid SK3 will be energized, the mirror latch 84 will be released, and the mirror 67 will fly up under the influence of the spring 83. When the mirror reaches its upper position, the switch S3 will be closed. That will cause the multivibrator 199 to be triggered, produce its output pulse, and will cause the gate 197 to produce the level MUS. Since the pulse SCP has disappeared by this time, the gate 192 will not produce a logic 1 output signal.

At the end of the pulse produced by the multivibrator 199, the multivibrator 200 will be triggered to produce the pulse EMD. The leading edge of this pulse will produce the timed pulse OT by triggering the multivibrator 201. That will cause the switch S11 to be closed.

The pulse EMD will reset the flip flop F2 through the gate 208, causing the level CLOSE to be removed. Removing the level CLOSE will open the switch S8, deenergizing the solenoid SK1 and allowing the shutter blades to move towards their open position.

The pulse EMD will also reset the flip flop F3 to remove the level TIME and open the switch S9. The capacitor C1 will accordingly begin to charge through the photocell 206.

When the capacitor C1 has charged to a voltage indicating that the film unit has been properly exposed, the Schmitt trigger 206 will produce a rising transition to trigger the one shot multivibrator 204. The pulse produced by the multivibrator 204, labeled EE, will set the flip flop F2 to produce the level CLOSE. At the same time, the pulse EE will set the flip flop F3 through the gate 207 to close the switch S9 and discharge the capacitor C1.

The CLOSE signal will close the switch S8 to cause the solenoid SK1 to be energized and close the shutter. When the shutter is closed, the switch S5 in FIG. 6 will be closed to trigger the multivibrator 196 to produce the pulse SCP.

In the presence of the level MUS from the gate 197, produced with the "mirror up" switch S3 closed, the pulse SCP will cause the AND gate 192 to produce a logic 1 output pulse that will set the flip flop F1 through the OR gate 190. The level RUN will now be produced to close the switch S7 and cause the motor 82 to run.

The cam 121 on the timing belt 107 will now engage the end 120 of the arm 119, as shown in FIG. 2 and more schematically in FIG. 6, and the mirror 67 will be driven down against the force of the spring 83. As the mirror moved down into its lower position, it will move back the latch 84 and become latched, closing the switch S2.

When the switch S2 closes, the multivibrator 211 will be triggered to produce the pulse MD. This pulse will set the flip flop F2 through the gate 208. The switch S8 will then be opened to deenergize the solenoid SK1 and allow the shutter to open.

The cam 121 will move free of the arm 120, and over into engagement with the picker finger operating arm 122, causing the uppermost film unit 72 just exposed in the manner described above to be advanced to the processing rolls 56 and 57, which are rotating at this time. The film unit will be driven through the processing rolls and out through the exit slot 65, for delivery to the photographer.

The belt 107 will continue to be driven until the cam 121 again momentarily closes the switch S4, causing the signal END to be produced by the multivibrator 195 in FIG. 6. The END signal will reset the flip flop F1 through the OR gate 194, causing the motor 82 to stop.

The apparatus will now be in a standby condition. Operation of the camera to take a series of pictures may continue in the manner just described above for a typical illustrative exposure. When the last film unit has been exposed and ejected, the camera housing 18 can be opened to allow the removal of the cassette body, in readiness for replacement by a new cassette.

While the invention has been described with respect to the details of a particular embodiment, many changes and variations will occur to those skilled in the art upon reading this description. Such can obviously be made without departing from the scope of the invention.

Having thus described the invention, what is claimed is:

1. In a camera, means forming a housing, motor means mounted in a first end of said housing, film processing means mounted in a second end of said housing opposite said first end and drivable to process a film unit advanced into engagement therewith, means forming a compartment in said housing between said motor means and said film processing means for receiving a supply of film units, means forming a framing aperture in said compartment to facilitate the successive exposure of film units in said compartment, mirror means, means mounting said mirror means for movement relative to said framing aperture between a first position and a second position, means comprising an endless flexible timing belt drivingly connecting said motor means to said processing means, and actuating element on said timing belt, and means operated by said actuating element for moving said mirror means from its first to its second position.

2. The apparatus of claim 1, further comprising releaseable latch means engaged by said mirror means in its second position for holding said mirror means in its second position, means biasing said mirror means toward its first position, and means for releasing said latch means.

3. In a camera, means forming a housing, motor means mounted in a first end of said housing, film processing means mounted in a second end of said housing opposite said first end and drivable to process a film unit advanced into engagement therewith, means forming a compartment in said housing between said motor means and said film processing means for receiving a supply of film units, means forming a framing aperture in said compartment to facilitate the successive exposure of film units in said compartment, mirror means, means mounting said mirror means for movement between first and second positions relative to said framing aperture, means comprising an endless flexible timing belt drivingly connecting said motor means to said processing means, an actuating element on said timing belt, means operated by said actuating element for moving said mirror means from its first to its second position, and means operated by said actuating element for advancing a film unit exposed in said framing aperture into engagement with said processing means.

4. In a reflex camera, the combination comprising, a housing, means forming a rectangular framing aperture in said housing, means forming a compartment in said housing confronting said framing aperture and adapted to receive a supply of film units for successive exposure in said framing aperture, mirror means mounted in said housing for movement between a first position and a second position, spring means biasing said mirror means toward its first position, detachable latch means engageable with said mirror means in its second position to releasably hold said mirror means in said second position, first shaft means mounted in said housing outside of said compartment for rotation about an axis parallel to and adjacent a first side of said framing aperture, motor means mounted in said housing adjacent said first side of said framing aperture and operable to drive said first shaft means, second shaft means mounted in said housing outside of said compartment for rotation about an axis parallel to and adjacent a second side of said framing aperture opposite said first side, processing means located in said housing and drivable to process individual film units advanced from said compartment into engagement with said processing means, means drivably connecting said second shaft means to said processing means to drive said processing means when said second shaft means is rotated, an elongated flexible timing belt extending outside of and along a third side of said framing aperture and coupling said first shaft means to said second shaft means, switching means operable to first and second states, means controlled by said switching means in its first state for energizing said motor means to drive said first shaft means and thereby drive said timing belt and said second shaft means, actuating means mounted on said timing belt, means engaged by said actuating means over a first range of position of said timing belt for driving said mirror means from its first position to its second position, means engaged by said actuating means over a second range of position of said timing belt for advancing a film unit in said compartment and exposed in said framing aperture into engagement with said processing means, and means operated by said actuating means in a position of said timing belt beyond the position assumed when a film unit has been processed by said processing means for operating said switching means to its second state to terminate the operation of said motor means.

5. In a reflex camera, the combination comprising means forming a housing, means forming a rectangular framing aperture in said housing, means forming a compartment confronting said framing aperture and adapted to receive a supply of film units for successive exposure through said framing aperture, mirror means mounted in said housing for rotation about a first axis parallel to a first side of said framing aperture between a first position and a second position, processing means mounted in said housing outside of said compartment adjacent a second side of said framing aperture opposite said first side and drivable to process individual film units advanced from said compartment into engagement with said processing means, film unit advancing means operable to engage a film unit in said compartment and exposed in said framing aperture and advance the film unit into engagement with said processing means, motor means mounted in said housing outside of said compartment adjacent said first side of said framing aperture, means comprising an elongated flexible endless timing belt in said housing outside of said compartment extending parallel to a third side of said framing aperture normal to said first side and drivably coupling said motor means to said processing means, an actuating element fixed to said timing belt for movement therewith over a closed path, means engaged by said actuating element over a first portion of said path for moving said mirror means from its first position to its second position, means engaged by said actuating element over a second portion of said path for operating said film unit advancing means, and means operated by said actuating element in a predetermined position along said path for terminating the operation of said motor means.

6. In a reflex camera, means forming a housing, motor means mounted in said housing adjacent a first end thereof, film processing means mounted in said housing adjacent a second end opposite said first end, said film processing means being drivable to process a film unit advanced into engagement therewith, means forming a framing aperture in said housing between said motor means and said film processing means, means forming a receptacle in said housing confronting said framing aperture to receive a supply of film units for successive exposure in said framing aperture, film advancing means, means mounting said film advancing means in said housing for movement over a closed path in a segment of which said advancing means is adapted to engage a film unit in said receptacle and exposed in said framing aperture and advance the film unit into engagement with said film processing means, mirror means, means mounting said mirror means in said housing for movement between a first position in which said mirror means covers said framing aperture and a second position in which said mirror means is adapted to reflect light into said framing aperture, means comprising an elongated relatively inextensible flexible endless timing belt connecting said motor means to said film processing means to drive said film processing means when said motor is energized, said timing belt extending alongside said receptacle and closely adjacent thereto, means forming an actuating element on said timing belt, means engaged by said actuating element over a first range of positions of said timing belt for moving said mirror means to said first position, and means engaged by said actuating element over a second range of positions of timing belt for moving said advancing means over said path segment and thereby advance a film unit into engagement with said film processing means.

7. In a reflex camera, means forming a housing, means forming a compartment in said housing to receive a supply of film units, means forming a rectangular framing aperture in said compartment to facilitate the successive exposure of film units in said compartment, an electric motor mounted in said housing adjacent a first end of said compartment and having a first output shaft rotatable about an axis parallel to a first side of said framing aperture, shaft speed reducing means connected to said first output shaft and having a second output shaft driven at a reduced speed relative to the speed of said first output shaft when said motor is energized, said second output shaft being rotatable about an axis parallel to said first side, a first gear connected to said second output shaft for rotation therewith, a third shaft, means mounting said third shaft in said housing adjacent a second end of said compartment opposite said first end for rotation about an axis parallel to said first side, a second gear connected to said third shaft for rotation therewith, a toothed endless timing belt connecting said first and second gears, said timing belt extending along a side of said compartment between said ends for movement over a closed path, a mirror, means mounting said mirror in said housing for rotation about an axis parallel to said first side for movement between a first position covering said framing aperture and a second position adapted to reflect light through said framing aperture, spring means biasing said mirror to its second position, releaseable latch means engaged by said mirror as said mirror moves into its first position for holding said mirror in said first position, means synchronized with said timing belt and effective when said mirror is in said second position for driving said mirror to said first position as said timing belt moves over a first region of said path, film processing means mounted in said housing adjacent a second end of said compartment opposite said first end and drivable to process a film unit advanced from said compartment into engagement with said film processing means, means coupled to said third shaft for driving said film processing means, film advancing means driven by said timing belt over a second range of position along said path for advancing a film unit in said compartment and exposed in said framing aperture into engagement with said processing means, a pair of terminals adapted to be connected to a source of voltage, switching means operable to connect said terminals to and disconnect said terminals from said motor to cause operation of said motor when a source is connected to said terminals, means for operating said switching means to connect said terminals to said motor, and means actuated by said timing belt in a position past said second range of positions by an amount sufficient to allow the processing of a film unit by said processing means for operating said switching means to disconnect said terminals from said motor.

8. In a reflex camera, means forming a housing, means forming a compartment in said housing to receive a supply of film units, means forming a rectangular framing aperture in said compartment to facilitate the successive exposure of film units in said compartment, an electric motor mounted in said housing adjacent a first end of said compartment and having a first output shaft rotatable about an axis parallel to a first side of said framing aperture, shaft speed reducing means connected to said first output shaft and having a second output shaft driven at a reduced speed relative to the speed of said first output shaft when said motor is energized, said second output shaft being rotatable about an axis parallel to said first side, a first gear connected to said second output shaft for rotation therewith, a third shaft, means mounting said third shaft in said housing adjacent a second end of said compartment opposite said first end for rotation about an axis parallel to said first side, a second gear connected to said third shaft for rotation therewith, a toothed endless timing belt connecting said first and second gears, said timing belt extending along a side of said compartment between said ends for movement over a closed path, a mirror, means mounting said mirror in said housing for rotation about an axis parallel to said first side for movement between a first position covering said framing aperture and a second position adapted to reflect light through said framing aperture, spring means biasing said mirror to its second position, releaseable latch means engaged by said mirror as said mirror moves into its first position for holding said mirror in said first position, means synchronized with said timing belt and effective when said mirror is in said second position for driving said mirror to said first position as said timing belt moves over a first region of said path, film processing means mounted in said housing adjacent said second end of said compartment opposite said first end and drivable to process a film unit advanced from said compartment into engagement with said film processing means, means coupled to said third shaft for driving said film processing means, film advancing means driven by said timing belt over a second range of positions along said path for advancing a film unit in said compartment and exposed in said framing aperture into engagement with said processing means, a pair of terminals adapted to be connected to a source of voltage, switching means operable to connect said terminals to and disconnect said terminals from said motor to cause operation of said motor when a source is connected to said terminals, lens means mounted on said housing for focusing an image of a scene on a film unit exposed in said framing aperture over an optical path including said mirror in said second position, shutter means operable between closed and open positions to block and unblock said optical path, respectively, manually operable means for producing an exposure initiating signal, means responsive to said signal for operating said shutter means to its closed position, means actuated when said shutter means is in its closed position and said mirror is in its first position for releasing said latch means to allow said mirror to move from its first to its second position, means actuated when said mirror is in its second position for sequentially operating said shutter means to its open position and then to its closed position to record an image on a film unit exposed in said framing aperture, means responsive to the operation of said shutter means to its closed position when said mirror is in its second position for operating said switching means to connect said terminals to said motor, and means actuated by said timing belt in a position past said second range of positions by an amount sufficient to allow the processing of a film unit by said processing means for operating said switching means to disconnect said terminals from said motor.

* * * * *